Patented May 6, 1952

2,595,767

UNITED STATES PATENT OFFICE 2,595,767

SYNTHESIS OF PHENYLCHLOROSILANES

Jerome T. Coe, Schenectady, and William A. Schwenker, Alplaus, N. Y., assignors to General Electric Company, a corporation of New York No Drawing. Application August 10, 1950, Serial No. 178,760

10 Claims. (Cl. 260—448.2)

The present invention relates to the preparation of organohalogenosilanes. It is particularly concerned with a method for the preparation of aryl-substituted halogenosilanes, especially the aryl-substituted trihalogenosilanes, which comprises effecting reaction at an elevated temperature between silicon, an aryl halide, and a hydrogen halide, whereby there is present in the reaction zone a preformed aromatic hydrocarbon corresponding to the aryl radical of the aromatic halide.

Rochow Patent 2,483,373, issued September 27, 1949, and assigned to the same assignee as the present invention, discloses a method for making aromatic halogenosilanes by effecting reaction between silicon and the aryl halide component of a mixture comprising an aryl halide and a hydrogen halide. One of the specific embodiments of this invention comprises effecting reaction between silicon and a mixture of ingredients comprising chlorobenzene and hydrogen chloride whereby increased yields of phenylchlorosilanes are obtained. When this reaction is carried out particularly at the elevated temperatures disclosed therein, it is found that undesirable amounts of benzene are obtained in the reaction mixture. Although the benzene can be treated later to form chlorobenzene and used again in the above described reaction, nevertheless, this constitutes a disadvantage in the practice of the Rochow invention.

We have now discovered that aryl halogenosilanes may be obtained in good yield with lower losses due to formation of aromatic hydrocarbons by employing in the reaction a preformed aromatic hydrocarbon in conjunction with the aryl halide (e. g., a nuclearly monohalogenated, dihalogenated, or other polyhalogenated aromatic hydrocarbon) and the hydrogen halide during passage of the latter two ingredients over the heated silicon. The use of the aromatic hydrocarbon in the above-described manner permits better control of the reaction and in general at given temperatures results in increased yields of the aryl halogenosilanes, particularly the aryl trihalogenosilanes, e. g., phenyltrichlorosilane, over those obtained when the reaction is effected between the silicon, aryl halide, and hydrogen halide in the absence of such aromatic hydrocarbon.

The invention is particularly directed to the preparation of such aromatic halogenosilanes as, for example, phenylhalogenosilanes (e. g., diphenyldichlorosilane, phenyltrichlorosilane, etc.), tolyl halogenosilanes (e. g., tolyltrichlorosilane, ditolyldibromosilane, etc.), xylyl halogenosilanes, biphenyl halogenosilanes, etc. Thus, in order to prepare the above-mentioned aryl halogenosilanes, we may employ, with the aryl halide for example, benzene with chlorobenzene when making phenylchlorosilanes, toluene when making tolyl halogenosilanes, xylene when making xylyl halogenosilanes, biphenyl when making biphenyl halogenosilanes, naphthalene when making naphthyl halogenosilanes, etc.

The amount of preformed aromatic hydrocarbon which will be used in each case may be varied within wide limits without departing from the scope of the invention. Thus, on a molar basis, we may employ from about 0.05 to 6 or 8 or more mols of the aromatic hydrocarbon per mol of the aryl halide. In making phenylchlorosilanes, we may use about 0.05 to 5 mols benzene per mol of chlorobenzene used during the reaction. It will, of course, be apparent to those skilled in the art that we do not intend to be limited to any particular molar ratio since, as will be apparent to skilled persons, the ratio may be varied widely depending upon the conditions of the reaction, the amount of hydrogen halide used, as well as the result desired.

In carrying out the invention, the aryl halide, preferably a monocyclic aryl halide, and aromatic hydrocarbon are mixed together and vaporized and heated to a temperature of about 200° to 400° C. The hydrogen halide, such as hydrogen chloride, is preferably added to the gaseous mixture of the aryl halide and aromatic hydrocarbon prior to passage of the mixture over the heated silicon. It will, of course, be apparent that different methods of mixing the reactants, other than the silicon or catalyst, may be employed without departing from the scope of the invention.

Although the hydrogen halide may be mixed with the aromatic halide and aromatic hydrocarbon and reacted in all proportions by weight or by volume, the actual amount of the hydrogen halide used will depend upon the degree of utilization of the hydrogen halide and conditions of reaction. Thus, in preparing the aryl halogenosilanes, we may advantageously use from about 0.01 mol to 3 or more mols of the hydrogen halide per mol of the aryl halide employed. Preferably, for each mol of aryl halide used in the reaction, we may mix or employ from approximately 0.1 to 2 mols of the hydrogen halide. As the amount of hydrogen halide present in the reaction zone increases and as the temperature increases, the amount of SiCl4 also tends to increase. On a weight basis, the preferable amount of the hydrogen halide employed in the production of a mixture of aromatic-substituted (e. g., aryl-substituted) halogenosilanes, especially the monoaromatic-substituted trihalogenosilanes, is advantageously about 1% to 75% or more based on the amount (i. e., weight) of the aryl halide used in the reaction.

In order that those skilled in the art may better understand how the present invention may be practiced, the following examples are given by way of illustration and not by way of limitation. All parts are by weight.

Example 1

A mixture of monochlorobenzene and benzene was pumped to an electrically heated vaporizer and superheater. The resulting superheated vapor (around 350° C.) was mixed with hydrogen chloride gas and the mixture admitted to the bottom of a reaction vessel where the inlet gas temperature was approximately 300° C. The reaction vessel employed containing powdered silicon and catalyst was a jacketed vessel of 6-inch inside diameter and 10 ft. vertical height, having a diffuser plate at the bottom to distribute the gaseous feed evenly over the cross-section. A porous ceramic filter was used at the top of the reactor to separate solids from the product gas stream, following which the gases were throttled from reaction pressure to atmospheric pressure and thereafter, the reaction product was condensed. The condensed product was fractionated in a batch of distillation column under atmospheric pressure until the still temperature was approximately 150° C. The quantity of overhead and bottoms was measured and the samples were analyzed.

The reaction tube was charged with powdered silicon and powdered copper catalyst in accordance with the directions in Rochow Patents 2,380,995 and 2,483,373 and the charge port thereafter closed. The silicon powder screen analysis (using sieves of U. S. standard sieve series) was about 50% −60 +200 mesh, about 25% −200 +400 mesh, and about 25% −400 mesh. The copper catalyst was copper antifouling pigment having an average particle diameter of about 2 microns, and more particularly described in Ferguson et al. Patent 2,443,902 issued June 22, 1948, and assigned to the same assignee, and in Hubbell Patent 2,420,540, issued May 13, 1947. Of the finally divided contact mass, 90 per cent, by weight, was silicon and 10 per cent, by weight, was the copper powder. The feed was then started at such a rate that the silicon and copper powders were maintained in a fluidized condition by the upward gas velocity. When a condensate was obtained in the product receiver, the reactor pressure was increased and the temperature adjusted to the desired operating conditions. Throughout the reaction which lasted in each case around 12.5 hours, the high and low temperatures ranged from about 475°–550° C., for the most part within the narrow range of 490°–530° C. The pressure was controlled during the reaction for the most part between 114 to 125 P. S. I. The superficial gas velocity was 0.1 to 0.3 ft. per second. The following results show further conditions of the reaction as well as the results obtained therefrom:

| Conditions | Run #1 | Run #2 |
|---|---|---|
| Feed: | | |
| Mol fraction chlorobenzene | .804 | .670 |
| Mol fraction benzene | | .160 |
| Mol fraction hydrogen chloride | .196 | .170 |
| Total | 1.000 | 1.000 |
| Phenyltrichlorosilane Produced, lbs | 290.5 | 262 |
| Raw Material Consumption: | | |
| Mols φCl/mol φSiCl3 | 3.88 | 3.14 |
| Mols HCl/mol φSiCl3 | 1.70 | 1.79 |
| Pounds φCl/lb. φSiCl3 | 2.06 | 1.67 |
| Pounds HCl/lb. φSiCl3 | 0.29 | 0.31 |
| By-product Benzene Produced in Excess of Benzene Fed: | | |
| Mols φH/mol φSiCl3 | 1.19 | 0.65 |
| Pounds φH/mol φSiCl3 | 0.44 | 0.244 |

Example 2

In this example essentially the same ingredients and the same conditions of temperature, pressure, and feed rate were used as in run No. 2 of Example 1, with the exception that the duration of the run was for 8 hours and the molar ratio of benzene to cholorobenzene in the feed was reduced, and only 5 per cent, by weight, of the copper-silicon mass was copper. In addition, for each mol of chlorobenzene employed there was used 0.08 mol benzene in the feed. Analysis of the chlorobenzene consumption showed that for each mol phenyltrichlorosilane produced, 3.1 mols chlorobenzene were consumed; on a weight basis this amounted to 1.64 pounds chlorobenzene used per pound phenyltrichlorosilane produced. For each mol phenyltrichlorosilane used, there was employed 1.22 mols HCl; on a weight basis this was equal to 0.21 pound HCl per pound $C_6H_5SiCl_3$. Analysis of the results of this reaction showed that for every mol of phenyltrichlorosilane obtained, there resulted only 0.63 mol benzene in excess of the amount of benzene fed. This compared with run No. 1 in Example 1 in which 1.19 mols benzene in excess of benzene fed were obtained for each mol of phenyltrichlorosilane produced.

Example 3

Tolylchlorosilane may also be prepared by effecting reaction at an elevated temperature between silicon and a mixture of ingredients comprising nuclearly chlorinated toluene (e. g, monochlorinated toluene), and a hydrogen halide, e. g., hydrogen chloride, using essentially the same conditions as described in the foregoing two examples. Similarly, biphenyl halogenosilanes may be produced using, chlorinated biphenyl, biphenyl, and hydrogen chloride in contact with silicon under the conditions recited above.

From the foregoing examples, it is clearly apparent that the addition of the aromatic hydrocarbon, e. g., benzene, to the reaction mixture materially improved the utilization of the aryl halide, e. g., chlorobenzene, and reduced the formation of by-product aromatic hydrocarbon, e. g., benzene.

It will, of course, be apparent to those skilled in the art that other hydrogen halides, for example, hydrogen bromide, hydrogen fluoride, etc., may also be used in place of the hydrogen chloride employed above. In addition, instead of making phenylchlorosilanes other aromatic or aryl halogenosilanes using, of course, the corresponding aromatic or aryl halide and corresponding aromatic hydrocarbon may be employed in place of the aryl halide and aromatic hydrocarbon used in the above examples.

The reaction may also be carried out in the presence of metallic catalysts other than copper for the reaction between the aromatic halide and silicon, e. g., nickel, tin, antimony, manganese, silver, titanium, etc. However, copper is the preferred catalyst. The advantageous effect of adding the aromatic hydrocarbon is encountered even though no catalyst is used. However, in most cases, for optimum conversion, a catalyst is preferred. Additional information concerning the use of catalysts and concentrations thereof may be found in the aforementioned Rochow Patent 2,380,995.

The preferred reaction temperatures, that is, the temperatures at which substantial yields of the aromatic halogenosilanes are obtained depend in general on such influencing factors as, for instance, the particular starting materials employed, the other reaction conditions, type of reactor, etc. The preferable range is from about 350° C. to 600° C., optimum results usually are obtained within the more limited range of about 450° to 550° C. Atmospheric, super-atmospheric, etc., pressures may also be used without departing from the scope of the invention.

When hydrogen halides are employed in which the halogen is different from the halogen present in the aromatic halide, certain amounts of aryl-substituted halogenosilanes will be obtained wherein the halogens attached to silicon in the aryl-substituted halogenosilanes will be different; that is, one halogen may be derived from the hydrogen halide and the other halogen may be derived from the aromatic halide. Such a situation will exist since the silicon atoms will combine at random with the halogen atoms present in the zone of reaction, whether alike or different.

From the results obtained in the foregoing examples, it is apparent that our invention is well suited to obtain improved yields of aromatic halogenosilanes, particularly aromatic trihalogenosilanes accompanied by greater conversion of the aromatic halides and less losses due to by-product formation of aromatic hydrocarbons than are possible when the aromatic hydrocarbon is omitted under comparable conditions.

The products obtained in the practice of our invention have utility in making various silicone oils, greases, resins, etc., which have outstanding heat stability. The arylhalogenosilanes are usually hydrolyzed by themselves or with other organohalogenosilanes to give siloxane linkages having silicon-bonded aryl radicals.

What we claim as new and desire to secure by Letters Patent of the United States is:

1. The method which comprises effecting reaction at an elevated temperature between silicon and a mixture of ingredients comprising an aryl halide, a hydrogen halide, and a preformed aromatic hydrocarbon corresponding to the aryl radical of the aryl halide.

2. The method which comprises effecting reaction between heated silicon and a mixture of ingredients comprising chlorobenzene preformed benzene, and a hydrogen halide.

3. The method as in claim 2 wherein the hydrogen halide, preformed benzene and chlorobenzene are substantially in the gaseous state while reacting with the silicon.

4. The method of preparing phenyl-substituted halogenosilanes which comprises effecting reaction between heated silicon and a mixture of ingredients in the vapor state comprising a hydrogen halide, monochlorobenzene, and preformed benzene, while the components are intimately associated with a metallic catalyst for the reaction.

5. The method of preparing phenyl-substituted chlorosilanes which comprises effecting reaction between heated silicon and a mixture of ingredients in the vapor state comprising chlorobenzene, preformed benzene, and hydrogen chloride, while the components are intimately associated with copper.

6. The method which comprises effecting reaction at a temperature of the order of from about 350°–600° C. between silicon and a mixture of ingredients comprising an aryl halide, a preformed aromatic hydrocarbon, and a hydrogen halide.

7. The method of forming an aryl halogenosilane which comprises passing a mixture of an aryl halide, a preformed aromatic hydrocarbon corresponding to the aryl radical of the aryl halide and hydrogen chloride over heated silicon.

8. The process which comprises passing a mixture comprising chlorobenzene, preformed benzene and hydrogen chloride over heated silicon at a temperature of from 350°–600° C. while the silicon is intimately associated with a catalyst comprising finely-divided silver and thereafter isolating the formed phenylchlorosilane.

9. The process which comprises passing a mixture comprising chlorobenzene, preformed benzene and hydrogen chloride over heated silicon at a temperature of from 350°–600° C. while the silicon is intimately associated with a catalyst comprising a finely-divided cupreous powder and thereafter isolating the formed phenylchlorosilane.

10. The process which comprises passing a mixture comprising chlorotoluene, preformed toluene, and hydrogen chloride over heated silicon at a temperature of from 350°–600° C. while the silicon is intimately associated with finely-divided copper.

JEROME T. COE.
WILLIAM A. SCHWENKER.

REFERENCES CITED

The following references are of record in the file of this patent:

UNITED STATES PATENTS

| Number | Name | Date |
| --- | --- | --- |
| 2,182,617 | Michel | Dec. 5, 1939 |
| 2,314,458 | Stahly | Mar. 23, 1943 |
| 2,436,957 | Eastman | Mar. 2, 1948 |
| 2,436,962 | Gaucher | Mar. 2, 1948 |
| 2,483,373 | Rochow | Sept. 27, 1949 |